US009686027B2

United States Patent
Yeshanov et al.

(10) Patent No.: US 9,686,027 B2
(45) Date of Patent: Jun. 20, 2017

(54) VALIDATION OF A TWO-WAY SATELLITE COMMUNICATION SYSTEM WITHOUT UTILIZING A SATELLITE

(71) Applicant: VIASAT, INC., Carlsbad, CA (US)

(72) Inventors: Alex Yeshanov, San Diego, CA (US);
Eric L Cross, Alpharetta, GA (US);
Bradley H Smith, Cumming, GA (US);
Ian F Winfield, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 404 days.

(21) Appl. No.: 14/717,983

(22) Filed: May 20, 2015

(65) Prior Publication Data
US 2017/0041088 A1    Feb. 9, 2017

(51) Int. Cl.
*H04B 17/00* (2015.01)
*H04B 17/40* (2015.01)
*H04B 7/185* (2006.01)
*H04B 17/391* (2015.01)

(52) U.S. Cl.
CPC ......... *H04B 17/40* (2015.01); *H04B 7/18508* (2013.01); *H04B 7/18519* (2013.01); *H04B 17/3912* (2015.01)

(58) Field of Classification Search
CPC .............................. H04L 41/145; H04W 24/00
USPC ..... 455/67.14, 427, 62, 405, 12.1, 447, 466, 455/431, 507; 370/243, 316; 709/239,
(Continued)

(56) References Cited

U.S. PATENT DOCUMENTS 4,907,247 A    3/1990 Miyake et al.
5,708,716 A *  1/1998 Tisdale .............. H04B 7/18565
                                                340/5.61
(Continued)

FOREIGN PATENT DOCUMENTS

CN    101309112 A    11/2008
CN    103338086 A    10/2013
(Continued)

OTHER PUBLICATIONS

Article entitled: "Satellite Channel Emulator Systems Test Overall System Performance"; Apr. 10, 2014; Jean-Pierre Joosting; 2 pages.
(Continued)

*Primary Examiner* — Tan H Trinh
(74) *Attorney, Agent, or Firm* — Fountainhead Law Group P.C.

(57) ABSTRACT

Disclosed is a method and apparatus for validating a two-way satellite communication system in an aircraft. The two-way satellite communication system may include a network access unit, a modem, and a satellite antenna assembly. A satellite link emulator may be disposed proximate the aircraft. A validation controller may initiate a validation test of the two-way satellite communication system using the satellite link emulator, including receiving, at the satellite link emulator, a transmitted uplink signal from the satellite antenna assembly, and transmitting, using the satellite link emulator, a downlink signal to the satellite antenna assembly in response to the received uplink signal. A pass/fail indication may be determined based on operation of the network access unit, the modem, and the satellite antenna assembly during the validation test.

19 Claims, 13 Drawing Sheets

(58) Field of Classification Search
USPC ...... 709/227, 203, 200; 342/357.42, 357.62; 703/22; 398/125
See application file for complete search history.

(56) References Cited

U.S. PATENT DOCUMENTS

| | | | |
|---|---|---|---|
| 6,272,341 B1* | 8/2001 | Threadgill | H04B 7/18506 455/428 |
| 8,054,221 B1 | 11/2011 | Luong et al. | |
| 8,145,966 B2 | 3/2012 | Roblett et al. | |
| 8,265,921 B2* | 9/2012 | Kim | H04L 41/145 703/19 |
| 8,565,921 B2* | 10/2013 | Doi | B62D 57/032 318/568.1 |
| 8,688,776 B1* | 4/2014 | Kolegayev | H04L 67/08 709/200 |
| 9,317,181 B2 | 4/2016 | Sizelove | G06F 3/0482 |
| 2001/0043574 A1* | 11/2001 | Nguyen | H01Q 1/1257 370/316 |
| 2001/0048669 A1* | 12/2001 | Kelly | H01Q 1/1257 370/316 |
| 2001/0048671 A1* | 12/2001 | Kelly | H01Q 1/1257 370/316 |
| 2002/0000931 A1* | 1/2002 | Petronic | H01Q 1/125 342/359 |
| 2002/0009058 A1* | 1/2002 | Kelly | H01Q 1/1257 370/316 |
| 2003/0058810 A1* | 3/2003 | Petronic | H04B 7/18591 370/316 |
| 2003/0112878 A1* | 6/2003 | Kloper | H04B 7/18547 375/259 |
| 2004/0033780 A1* | 2/2004 | Kelly | H04B 7/18519 455/11.1 |
| 2004/0106404 A1* | 6/2004 | Gould | B64D 47/00 455/431 |
| 2005/0053026 A1* | 3/2005 | Mullan | H04B 7/18508 370/316 |
| 2005/0230557 A1* | 10/2005 | Aghili | B64G 7/00 244/158.1 |
| 2006/0045038 A1* | 3/2006 | Kay | H04B 7/18523 370/316 |
| 2006/0100846 A1* | 5/2006 | Lee | B64G 7/00 703/22 |
| 2012/0226622 A1* | 9/2012 | Gonzalez | G06F 17/3087 705/319 |
| 2013/0003651 A1* | 1/2013 | Hobaya | H04L 45/60 370/316 |
| 2013/0029701 A1* | 1/2013 | Cabos | H04B 7/18502 455/466 |
| 2013/0271317 A1* | 10/2013 | Goel | G01S 19/23 342/357.62 |
| 2014/0044434 A1* | 2/2014 | Hashimoto | H04B 10/6164 398/125 |
| 2014/0087668 A1* | 3/2014 | Mow | H04W 24/00 455/67.14 |
| 2014/0228036 A1* | 8/2014 | Feria | H04W 16/02 455/447 |
| 2014/0253372 A1* | 9/2014 | Davis | G01S 19/23 342/357.42 |
| 2016/0234281 A1* | 8/2016 | Padmanabhan | H04L 65/80 |
| 2016/0254854 A1* | 9/2016 | Wharton | H04B 7/18519 455/12.1 |

FOREIGN PATENT DOCUMENTS

| | | |
|---|---|---|
| KR | 101262169 B1 | 5/2013 |
| WO | 02099769 A1 | 12/2002 |
| WO | 2013000852 A1 | 1/2013 |

OTHER PUBLICATIONS

Article entitled: "Satellite Testing Demands RF Link Emulation"; Oct. 2008; Michael Cagney, dBm; 3 pages.

* cited by examiner

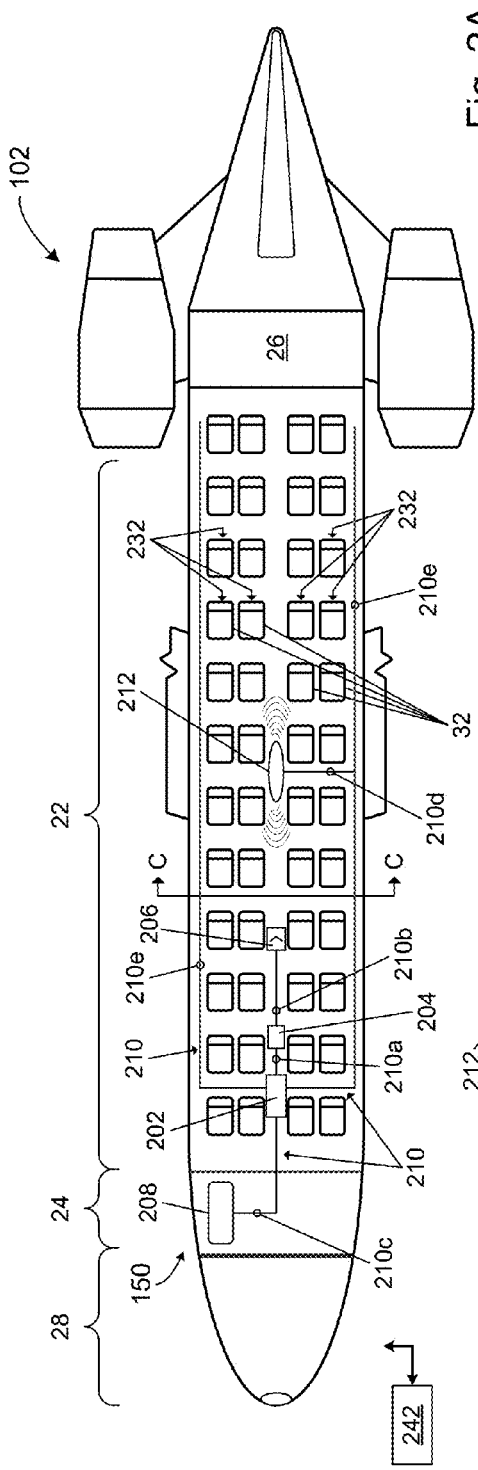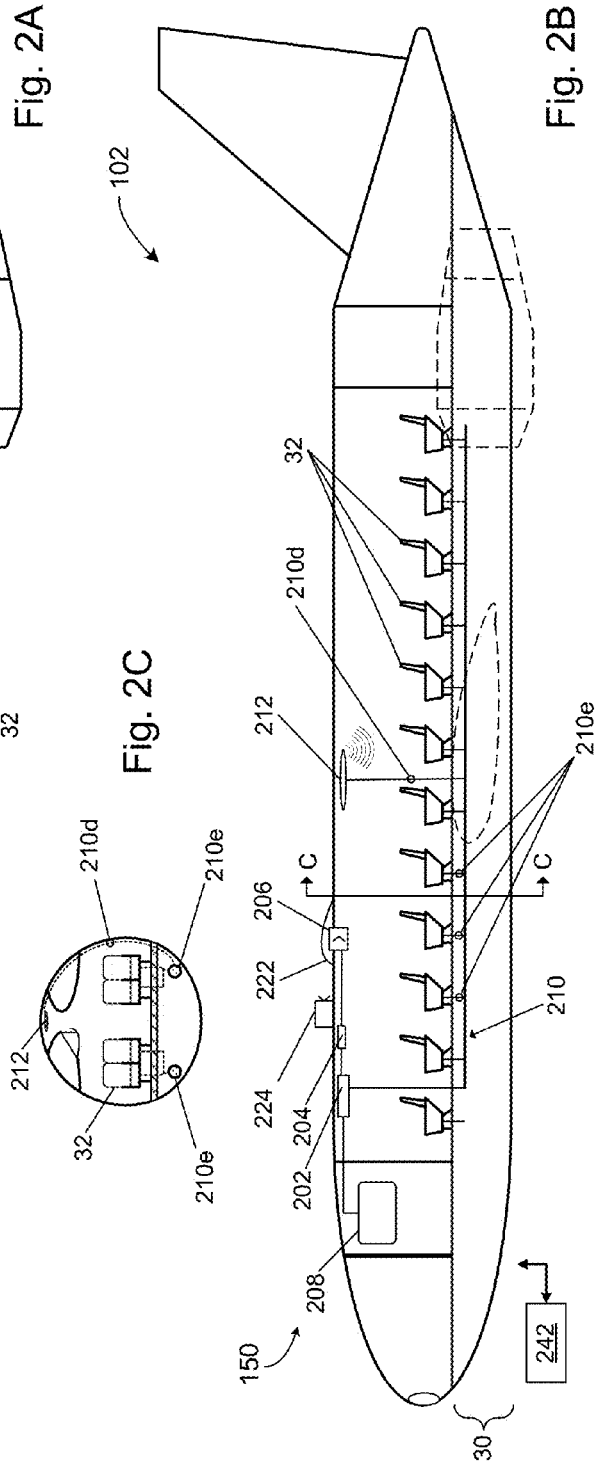

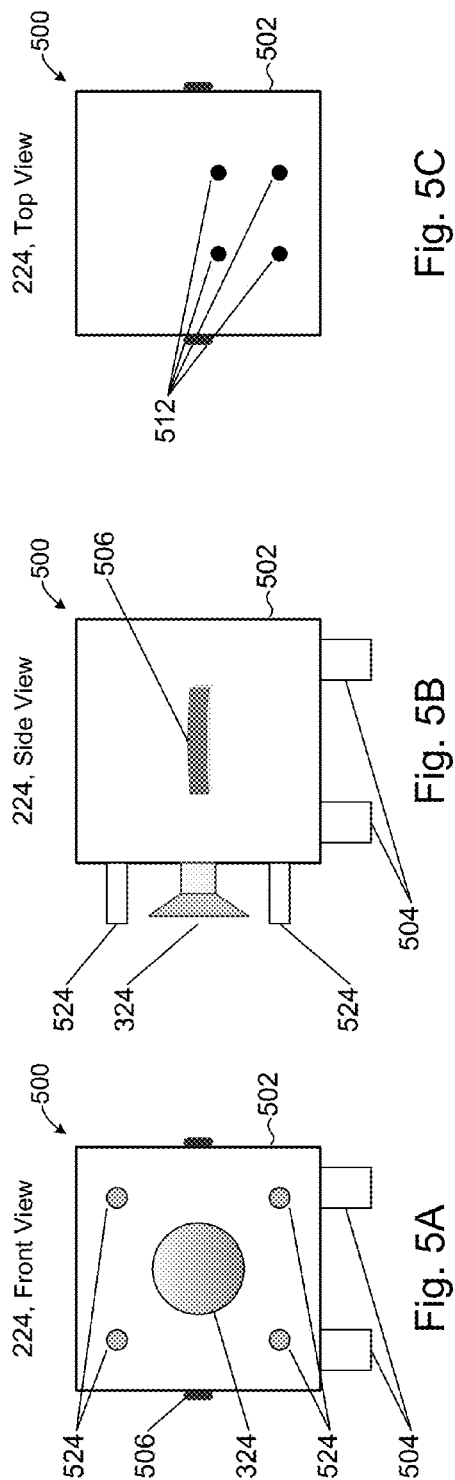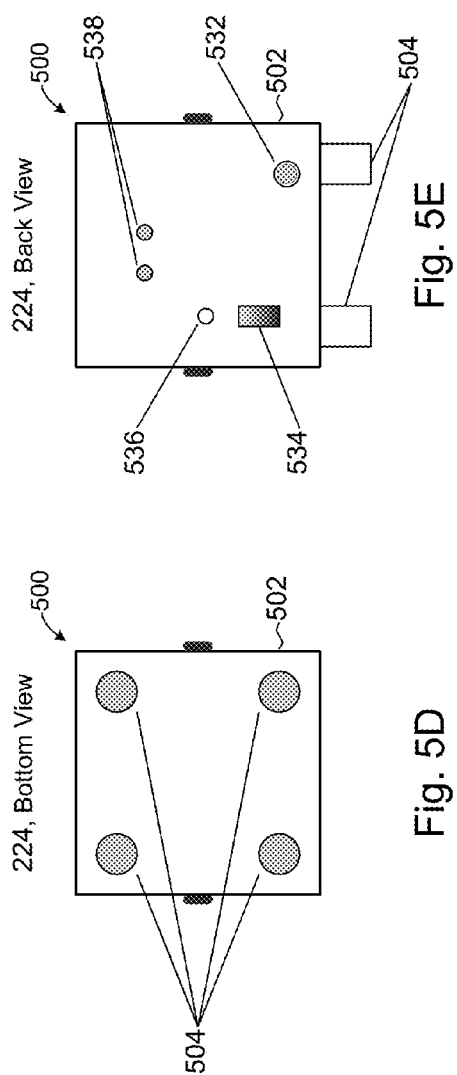

VALIDATION OF A TWO-WAY SATELLITE COMMUNICATION SYSTEM WITHOUT UTILIZING A SATELLITE

BACKGROUND

Unless otherwise indicated, the foregoing is not admitted to be prior art to the claims recited herein and should not be construed as such.

A two-way satellite communication system may include a number of components such as server(s), modem(s), router(s), power supply(ies), RF electronics, antenna positioner(s) and antenna(s) that are installed on an aircraft or other mobile platform. These components may be connected together using a number of cables, and initially may not be connected and/or communicating with other components properly.

An installation process, accordingly, may include verifying the installation and the performance of the satellite communication system prior to being put into service (e.g. before flight). Typically, the installation process occurs inside the facility where assembly of the aircraft takes place, for example, within a hangar. When the installed components of the satellite communication system are ready for testing, the aircraft may be taxied out of the hangar onto the tarmac to provide visibility to a satellite in orbit. The process can be costly in terms of the personnel needed to bring the aircraft onto the tarmac and then to bring the aircraft back into the hangar after performing the testing. The process can also be time-consuming in terms of the time it takes to bring the aircraft onto the tarmac for testing, running the actual test, and then bringing the aircraft back into the hangar. These costs can be exacerbated when a fault is detected that requires troubleshooting of the installation and re-testing to be performed.

SUMMARY

In one embodiment, a method of validating a two-way satellite communication system in an aircraft may include providing the two-way satellite communication system in the aircraft. The two-way satellite communication system may include a network access unit, a modem, and a satellite antenna assembly. The network access unit may provide network access for a plurality of data devices. The modem may modulate uplink data received from the network access unit to obtain an uplink signal, and demodulate a downlink signal to obtain demodulated downlink data that can be provided to the network access unit. The satellite antenna assembly may transmit the uplink signal, and receive the downlink signal. The method may further include arranging a satellite link emulator proximate the aircraft, and performing a validation test of the two-way satellite communication system using the satellite link emulator. The validation test may include receiving, at the satellite link emulator, the transmitted uplink signal from the satellite antenna assembly, and transmitting, using the satellite link emulator, the downlink signal to the satellite antenna assembly in response to the received uplink signal. A pass/fail indication may be determined based on operation of the network access unit, the modem, and the satellite antenna assembly during the validation test.

In another embodiment, an apparatus may include a two-way satellite communication system in an aircraft. The two-way satellite communication system may include a network access unit to provide network access for a plurality of data devices. The two-way satellite communication system may also include a modem to modulate uplink data from the network access unit to obtain an uplink signal, and demodulate a downlink signal to obtain a demodulated downlink signal that can be provided to the network access unit. The two-way satellite communication system may also include a satellite antenna to transmit the uplink signal, and to receive the downlink signal. The apparatus may also include a validation system to validate the two-way satellite communication system. The validation system may include a satellite link emulator, and a validation controller to initiate a validation test of the two-way satellite communication system using the satellite link emulator. The validation test may include communicating data traffic in the two-way satellite communication system to cause the satellite antenna assembly to transmit the uplink signal to the satellite link emulator, and in response cause the satellite link emulator to transmit the downlink signal to the satellite antenna assembly. The validation controller may further determine a pass/ fail indication based on operation of the network access unit, the modem, and the satellite antenna assembly during the validation test.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 2A-2C show views of a two-way satellite communication system on an aircraft with a test installation in accordance with the present disclosure.

FIGS. 5A-5E show views of a housing for the satellite link emulator.

FIGS. 6, 6A-1, and 6A-2 show a process for a validation test in accordance with an embodiment.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
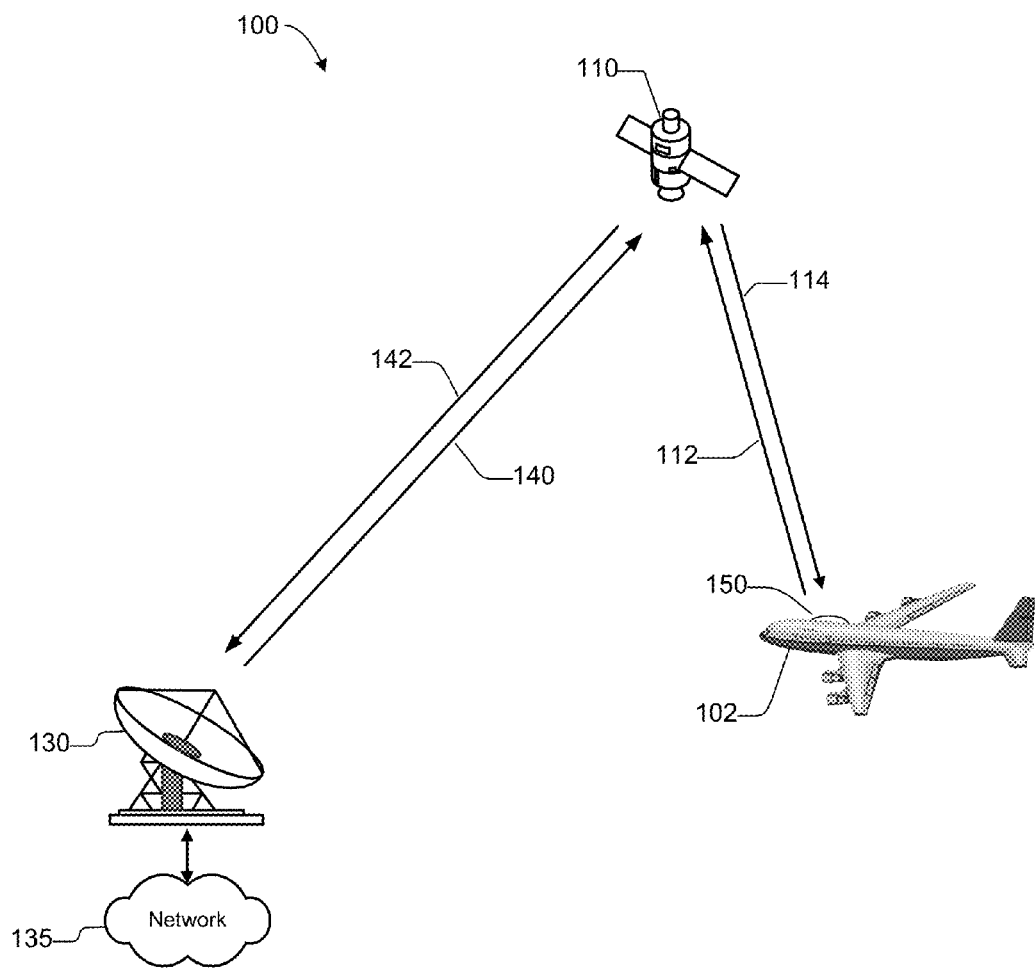
FIG. 1 shows a high level representation of a two-way satellite communication system.

FIG. 1 illustrates an example of a communication environment 100 in which a two-way satellite communications system 150 as described herein can be used. Many other configurations are possible having more or fewer components than shown in FIG. 1.

In some embodiments, the two-way satellite communications system 150 may be installed in aircraft 102. In the illustrated embodiment, the aircraft 102 is an airplane. Alternatively, in other embodiments, the two-way satellite communications system 150 may be installed in other types of mobile vehicles, such as a helicopter, drone, etc.

As described in more detail below, the two-way satellite communications system 150 can facilitate communication between the aircraft 102 and satellite 110 (referred to hereinafter as a "target satellite 110"). Although only one aircraft 102 is illustrated in FIG. 1 to avoid over complication of the drawing, the communication environment 100 can include many more aircraft 102 having respective two-way satellite communications system 150 installed therein. Similarly, although only one satellite 110 is illustrated in FIG. 1, the communication environment 100 can include additional satellites.

In the illustrated example, the target satellite 110 may provide bidirectional communication between the aircraft 102 and a gateway terminal 130. The gateway terminal 130 is sometimes referred to as a hub or ground station. The gateway terminal 130 may include an antenna to transmit a forward uplink signal 140 to the target satellite 110 and receive a return downlink signal 142 from the target satellite 110. The gateway terminal 130 may schedule traffic to the two-way satellite communications system 150. Alternatively, the scheduling may be performed in other parts of the communication environment 100 (e.g., a core node, satellite access node, or other components, not shown). Forward uplink signal 140 and return downlink signal 142 communicated between the gateway terminal 130 and target satellite 110 may use the same, overlapping, or different frequencies as respective forward downlink signal 114 and return uplink signal 112 communicated between the target satellite 110 and the two-way satellite communications system 150.

Network 135 may be interfaced with the gateway terminal 130. The network 135 may be any type of network and can include for example, the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication between devices as described herein. The network 135 may include both wired and wireless connections as well as optical links. In the illustrated example, the network 135 may connect multiple gateway terminals 130 that may be in communication with target satellite 110 and/or with other satellites (not shown).

The gateway terminal 130 may be provided as an interface between the network 135 and the target satellite 110. The gateway terminal 130 may be configured to receive data and information directed to the two-way satellite communications system 150 from a source accessible via the network 135. The gateway terminal 130 may format the data and information and transmit forward uplink signal 140 to the target satellite 110 for delivery to the two-way satellite communications system 150. Similarly, the gateway terminal 130 may be configured to receive return downlink signal 142 from the target satellite 110 (e.g., containing data and information originating from the two-way satellite communications system 150) that is directed to a destination accessible via the network 135. The gateway terminal 130 may also format the received return downlink signal 142 for transmission on the network 135.

The target satellite 110 may receive the forward uplink signal 140 from the gateway terminal 130 and transmit corresponding forward downlink signal 114 to the two-way satellite communications system 150. Similarly, the target satellite 110 may receive return uplink signal 112 from the two-way satellite communications system 150 and transmit corresponding return downlink signal 142 to the gateway terminal. The target satellite 110 may operate in a multiple spot beam mode, transmitting and receiving a number of narrow beams directed to different regions on Earth. Alternatively, the target satellite 110 may operate in wide area coverage beam mode, transmitting one or more wide area coverage beams.

The target satellite 110 may be configured as a "bent pipe" satellite that performs frequency and polarization conversion of the received signals before retransmission of the signals to their destination. As another example, the target satellite 110 may be configured as a regenerative satellite that demodulates and remodulates the received signals before retransmission.

In the illustrated example, the target satellite 110 is a geostationary satellite. Alternatively, the target satellite 110 can be a non-geostationary satellite, such as a low earth orbit (LEO) or medium earth orbit (MEO) satellite.

Referring to FIGS. 2A and 2B, the discussion will now turn to a description of some details of the two-way satellite communication system 150 (FIG. 1). FIG. 2A shows a cutaway top-view of aircraft 102, and FIG. 2B shows a cutaway side-view of aircraft 102. In some embodiments, such as shown in FIGS. 2A and 2B, the two-way satellite communication system 150 may be installed in an airplane. In other embodiments, the two-way satellite communication system 150 may be installed in any suitable mobile platform; e.g., helicopter, drone, etc. In still other embodiments, the two-way satellite communication system 150 may be installed in a mobile platform other than in an aircraft 102; e.g., trains, ships, etc.

The aircraft 102 may include a passenger compartment 22 to provide seats 32 for passengers. The aircraft 102 may include a forward service area 24 and a rearward service area 26. The service areas 24, 26 may include lavatories, food preparation areas, and so on. In other embodiments, the passenger compartment 22 may be partitioned into two more passenger compartments by additional service areas. The aircraft 102 may include a cockpit area 28 for the pilots and to house communications equipment, flight control equipment, and other avionics (not shown).

The two-way satellite communication system 150 may include equipment such as a network access unit 202, a modem 204, a satellite antenna assembly 206, a server 208, and a wireless access point (WAP) 212. The seats 32 may be equipped with data devices 232, such as for example, passenger seat back systems depicted in FIG. 2B. Although not shown, the two-way satellite communication system 150 may include additional equipment such as power supply(ies) and other electronics. Other configurations of the two-way satellite communication system 150 may include additional network access units 202, servers 208, modems 204, antenna assemblies 206, and so on.

These equipment can be installed in various locations in the aircraft 102. For example, the server 208 may be installed in the forward service area 24 of the aircraft 102, as depicted in FIG. 2A. In other configurations, the server 208 may be installed in the rearward service area 26 of the aircraft 102. Still other locations may be suitable for other configurations of the aircraft 102. Similarly, in some configurations, the network access unit 202 and modem 204 may be installed in the passenger compartment 22 of the aircraft 102, as shown in FIG. 2B for example. Likewise with the satellite antenna assembly 206. As can be seen in FIG. 2B, the satellite antenna assembly 206 may be enclosed in a radome 222, which can be a dome or other structure that is transparent to radio waves and serves to protect the satellite antenna assembly 206.

The two-way satellite communication system 150 may include a system of cables 210 that interconnect the equipment. For example, a cable 210a may connect the network access unit 202 to modem 204. A cable 210b may connect modem 204 to satellite antenna assembly 206. A cable 210c may connect the network access unit 202 to the server 208. A cable 210d may connect the WAP 212 to the network access unit 202, and so on. The data devices 232 may be connected to the network access unit 202 via cables 210e, which are illustrated more clearly in FIG. 2B. The cross-sectional view shown in FIG. 2C taken along view line C-C further illustrates the installation of cables 210d and 210e in the cargo area 30.

The equipment comprising the two-way satellite communication system 150 may constitute a data network within the aircraft 102. The network access unit 202 may provide network access to data devices 232 within the aircraft 102 to support two-way data communications with the network 135 via the satellite 110 and gateway terminal 130. The data devices 232 may, for example, include passenger seat back systems or other devices on the aircraft 102. As further examples, the data devices 232 may include mobile devices (e.g., smartphones, laptops, tablets, netbooks, and the like) such as personal electronic devices (PEDs) brought onto the aircraft 102 by passengers. The data devices 232 may communicate with the network access unit 202 via a communication link that may be wired and/or wireless. The communication link may be, for example, part of a local area network such as a wireless local area network (WLAN) supported by WAP 212. One or more WAPs may be distributed about the aircraft, and may, in conjunction with the network access unit 202, provide traffic switching or routing functionality; for example, as part of a WLAN extended service set (ESS), etc. The network access unit 202 may also provide network access for services local to the aircraft 102. For example, network access unit 202 may allow passengers to access the server 208 using the data devices 232. The server 208 may be an in-flight entertainment server, and so on.

In operation, the network access unit 202 may provide uplink data received from the data devices 232 to the modem 204 to generate modulated uplink data (e.g., a transmit IF signal) for delivery to the satellite antenna assembly 206. The satellite antenna assembly 206 can upconvert and then amplify the modulated uplink data to generate the return uplink signal 112 (FIG. 1) for transmission to the satellite 110 (FIG. 1). Similarly, the satellite antenna assembly 206 can receive the forward downlink signal 114 (FIG. 1) from the satellite 110. The satellite antenna assembly 206 can amplify and then downconvert the forward downlink signal 114 to generate modulated downlink data (e.g., a receive IF signal) for demodulation by the modem 204. The demodulated downlink data from the modem 204 can then be provided to the network access unit 202 for routing to the data devices 232. The modem 204 can be integrated with the network access unit 202, or may be a separate component, in some examples.

The cables 210 that interconnect the equipment comprising the two-way satellite communication system 150 may be any suitable design. The cables 210 may include electrical wires and/or optical fibers. There may be junction boxes (not shown) to connect runs of cabling along the length of the aircraft 102. A variety of connectors (e.g., CAT-5 connectors, optical couplers, etc.) may be used to connect together segments of cables, to connect cables to the equipment (e.g., network access unit 202, server 208, etc.), and so on. Alternatively, some or all of the equipment may communicate wirelessly with the other equipment. In yet other embodiments, the communication between each of the various equipment may be a combination of wired and wireless communications.

The installation of equipment comprising the two-way satellite communication system 150 and interconnecting the equipment can be a complicated, labor intensive effort, and hence subject to error. There may be issues of interoperability between equipment that come from different vendors. There may be challenges in properly connecting the equipment together and/or ensuring proper communications between equipment, including equipment that are wired together and equipment that communicate wirelessly. Merely as an example, if the cabling is not properly connected to the equipment (e.g., modem 204, network access unit 202, satellite antenna assembly 206, etc.), or is faulty, then communication between pieces of equipment can be garbled; e.g., noisy, lossy, intermittent, not at all, etc.

Accordingly, one or more validation tests may be performed to assess proper operation of the two-way satellite communication system 150 prior to putting the aircraft 102 into service (e.g., before flight). In some embodiments, for example, a validation test may include determining the quality of installation (QOI), since proper operation of the two-way satellite communication system 150 indicates proper installation of its constituent equipment. In some embodiments, QOI may be assessed by running data communication tests to check out the connectivity and operation of the equipment that comprise the two-way satellite communication system 150.

Proper operation of the two-way satellite communication system 150 may require compliance with various regulations. For example, governmental regulations may require certifying that the installed two-way satellite communication system 150 operates within established limits for electromagnetic interference (EMI). Accordingly, in some embodiments, a validation test may include conducting an avionics electromagnetic interference (EMI) test that involves transmitting and receiving traffic data using the two-way satellite communication system 150.

More generally, a validation test may include any one or a combination of suitable tests to assess proper operation of the two-way satellite communication system 150. QOI testing and EMI assessment are just two examples of such tests. In some embodiments, for example, a validation test may include assessment of QOI, conducting an EMI test, or both assessing QOI and conducting an EMI test.

In some instances, the installation site, or other location at which the validation test may be performed, may not have visibility to the satellite 110. For example, the installation of the two-way satellite communication system 150 in the aircraft 102 may occur in a hangar or other indoor location. Moving the aircraft 102 outdoors to gain line of sight view with a satellite can be time consuming and expensive. In some instances, the installation may occur at a location that is outside the coverage area of the satellite 110, and so on where line of sight access to the satellite 110 may be inconvenient or not possible.

Continuing with FIGS. 2A and 2B, in accordance with the present disclosure, a satellite link emulator 224 may be arranged proximate to the aircraft 102 during or prior to a validation test. As used herein, the term proximate refers to arranging the satellite link emulator 224 at a close physical distance to the aircraft 102 relative to the distance between the aircraft 102 and the satellite 110. For example, the satellite link emulator 224 may be in the vicinity of the aircraft 102, such as being arranged on, adjacent to, or near the aircraft 102. The satellite link emulator 224 may be positioned to allow for line of sight alignment between the satellite antenna assembly 206 and the satellite link emulator 224. During a validation test, the satellite link emulator 224 can provide for testing of the two-way satellite communication system 150 to simulate end users on the aircraft 102 to "exercise" the equipment that comprises the satellite communication system 150 and provide validation of installation and functionality of the two-way satellite communication system 150, without having to communicate with an actual satellite. As described in more detail below, during the validation test the satellite link emulator 224 may be positioned to receive the return uplink signal 112 that, during normal operation, would be intended for the satellite 110. In some embodiments, the return uplink signal 112 transmitted by the two-way satellite communication system 150 during the validation test can have the same signal characteristics (e.g., transmit power level, data rate, frequency range, etc.) as when transmitted during normal operation. Alternatively, one or more of the characteristics of the return uplink signal 112 transmitted during the validation test can be different than during normal operation. For example, the transmit power level may be lower during the validation test because of the relatively close proximity of the satellite link emulator 224 to the aircraft 102 as compared to the satellite 110. In response to the received return uplink signal 112, the satellite link emulator 224 can transmit the forward downlink signal 114 to the two-way satellite communication system 150. Similar to the discussion above, the signal characteristics of the forward downlink signal 114 transmitted by the satellite link emulator 224 may be the same as that transmitted by the satellite 110 during normal operation. Alternatively, one or more of the signal characteristics may be different.

In some embodiments, the satellite link emulator 224 may be attached to or otherwise placed on the fuselage or body of the aircraft 102. In accordance with the present disclosure, the attachment may be temporary for the purposes of performing the validation test only. In other embodiments, the satellite link emulator 224 may be separated from the aircraft 102, but otherwise positioned such that line of sight alignment between the antenna assembly 206 and the satellite link emulator 224 can be achieved.

In some embodiments, a validation controller 242 can be used to initiate a validation test in accordance with the present disclosure. The satellite link emulator 224 and the validation controller 242 may collectively be referred to herein as a validation system to validate the two-way satellite communication system 150. The functions of the validation controller 242 may be implemented by hardware, instructions embodied in a memory and formatted to be executed by one or more general or application-specific processors, firmware, or any combination thereof. The validation controller 242 may be a separate device from the two-way satellite communication system 150, such as a portable computer; e.g., a laptop computer, a computer tablet, and the like. The validation controller 242 may for example connect (e.g., via an Ethernet cable) to a data port of the network access unit 202, or as another example may communicate wirelessly with the network access unit 202. The validation controller 242 may communicate with other equipment comprising the two-way satellite communication system 150. Alternatively, some or all of the functionality provided by the validation controller 242 may be implemented within the equipment of the two-way satellite communication system 150.

Figure 3:
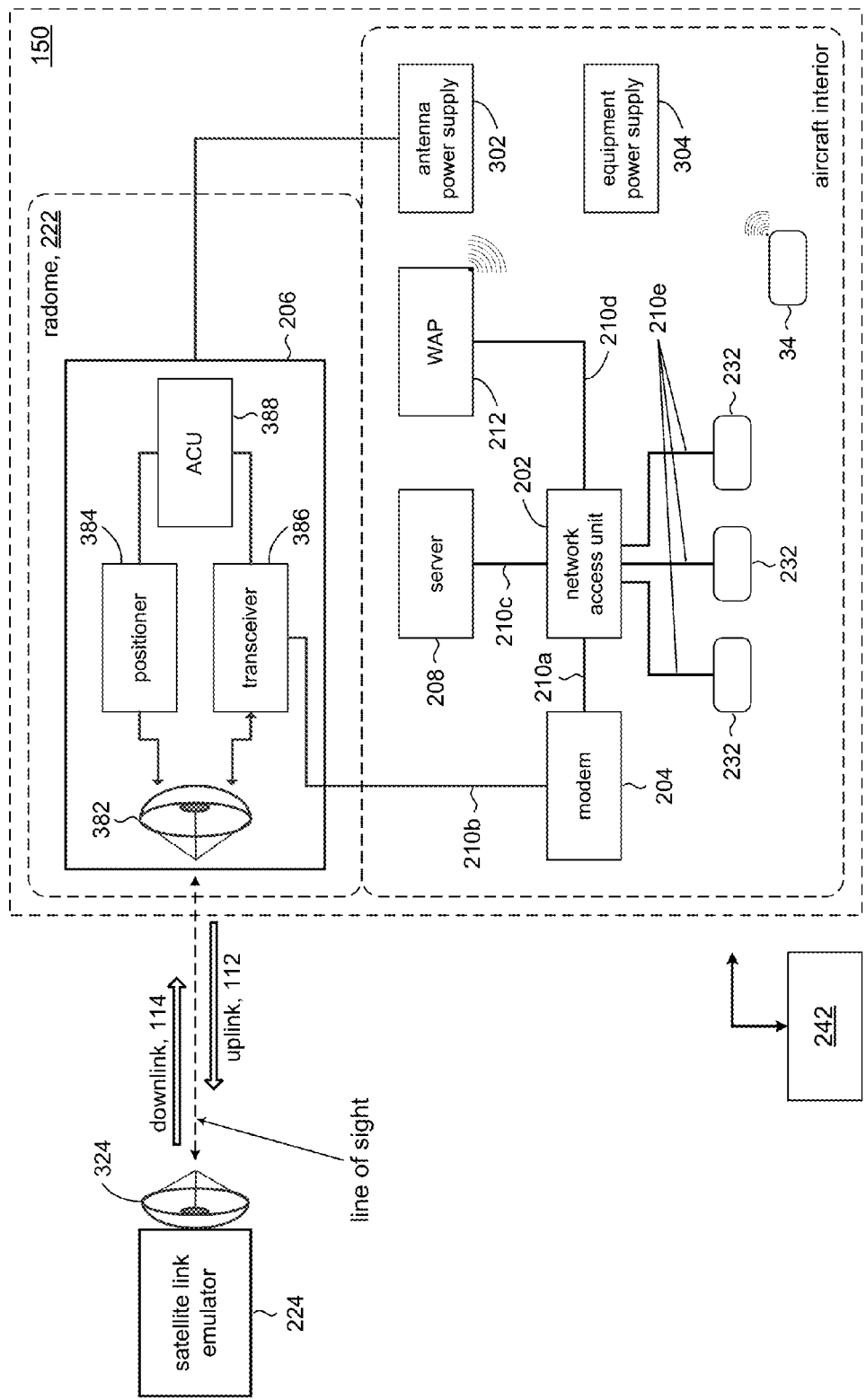
FIG. 3 shows a block diagram representation of equipment shown in FIGS. 2A-2C.

FIG. 3 shows that the satellite link emulator 224 may include an antenna 324 such as a horn antenna operable to receive the return uplink signal 112 and transmit the forward downlink signal 114 during the validation test. FIG. 3 further shows a diagrammatic representation of an example of two-way satellite communication system 150 that includes additional equipment and additional detail of an example of the satellite antenna assembly 206. Equipment in the aircraft interior (e.g., forward service area 24, cargo area 30, etc.) may further include power supply equipment. For example, an antenna power supply 302 may provide power to the antenna assembly 206 and one or more equipment power supplies 304 may provide power to the other equipment comprising the two-way satellite communication system 150.

The antenna assembly 206 may include a satellite antenna 382. The satellite antenna 382 may include one or more antenna elements. In some embodiments, the same one or more antenna elements can be operable to transmit the return uplink signal 112 and transmit the forward downlink signal 114. Alternatively, the satellite antenna 382 may include a first set of one or more antenna elements for transmitting the return uplink signal 112, and a second set of one more antenna elements for receiving the forward downlink signal 114. The satellite antenna 382 may comprise an array of waveguide elements arranged in a rectangular panel. Alternatively, other types of structures and antenna elements may be used.

During normal operation, an antenna positioner 384 may point the satellite antenna 382, for example, toward a satellite in orbit around the earth. An antenna control unit 388 may provide control signals to control the antenna positioner 382 and transceiver 386. The antenna positioner 384 may, for example, be an elevation-over-azimuth (EL/AZ) two-axis positioner. Alternatively, the positioner 384 may include other mechanisms. In accordance with the present disclosure, during the validation test the satellite antenna 382 may be positioned to point at the antenna 324 of the satellite link emulator 224. The pointing may be performed by adjusting the azimuth and elevation of the satellite antenna 382 via the antenna positioner 384.

In the illustrated embodiment, the satellite antenna assembly 206 includes a transceiver 386. The transceiver 386 can amplify and downconvert the return uplink signal 112 received from satellite antenna 382 to generate modulated downlink data (e.g., a receive IF signal) for delivery to the modem 204 for demodulation. Similarly, the transceiver 386 can upconvert and then amplify modulated uplink data (e.g., a transmit IF signal) received from the modem 204 to generate the return uplink signal 112 for delivery to the satellite antenna 382. In the illustrated embodiment, the transceiver 386 is located outside the fuselage of the aircraft 102 and under the radome 222. Alternatively, the transceiver 386 may be located in a different location.

In some embodiments, the satellite link emulator 224 may be positioned several feet from the satellite antenna 382, the actual distance depending on factors such as available space where the satellite link emulator 224 can be placed, available equipment for mounting and/or positioning the satellite link emulator 224, and so on. For example, the satellite link emulator 224 may be mounted to the aircraft 102, mounted on scaffolding and positioned close to the aircraft, mounted on a boom suspension system, and so on.

Figure 3A:
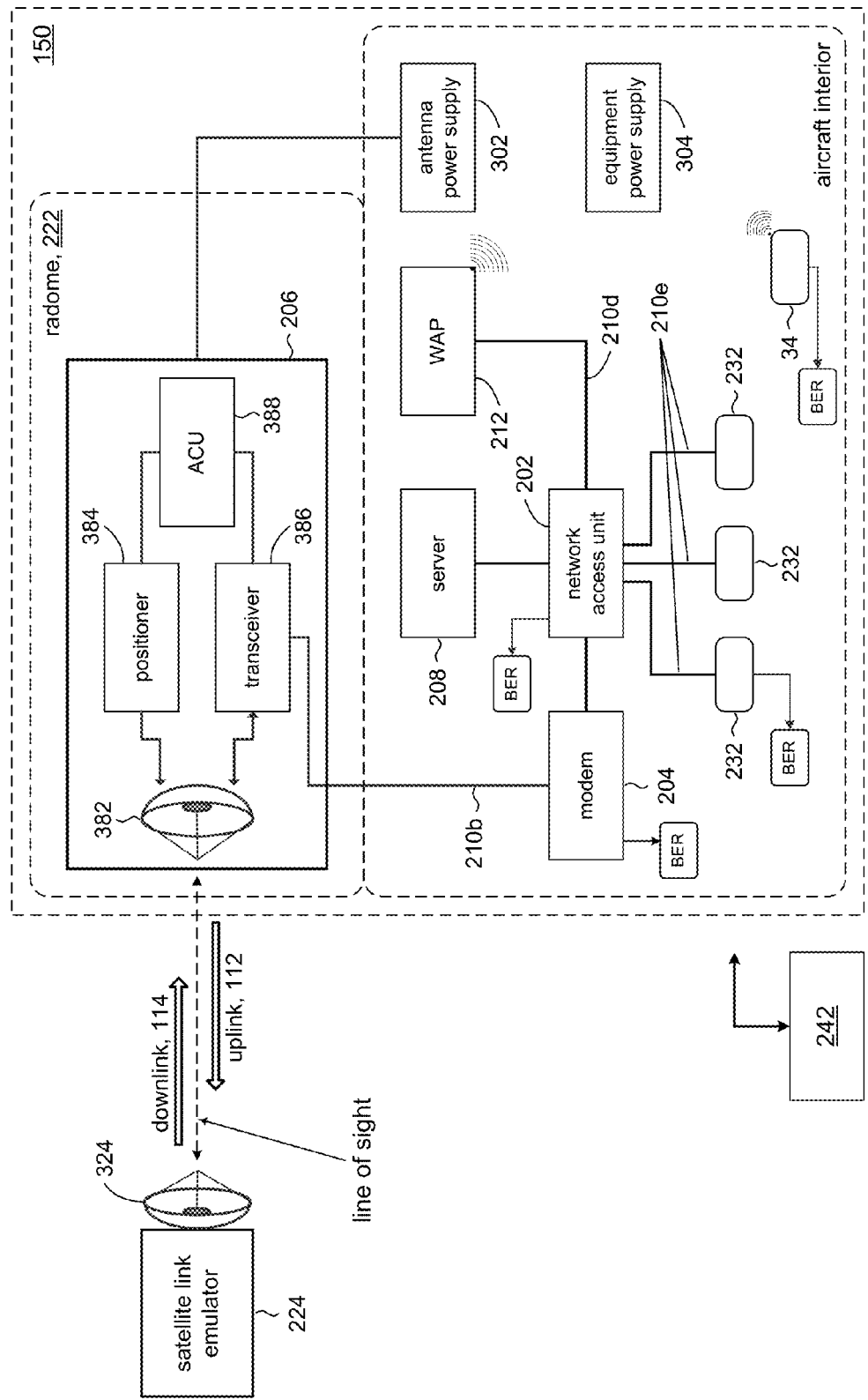
FIGS. 3A and 3B illustrate configurations of the satellite communication system in accordance with tests that can be performed on the communication subsystem.

A validation test in accordance with embodiments of the present disclosure may include making an assessment of QOI. The QOI may be based on any signal quality metric during operation of the two-way satellite communication system 150. Referring to FIG. 3A, for example, in some embodiments, the bit error rate (BER) may be used to assess QOI. BER refers to the number of bit errors that occur per unit of time. The BER may be measured while operating the two-way satellite communications system 150, for example, by simulating traffic through the two-way satellite communications system 150. The BER may be measured in any of several locations in the two-way satellite communication system 150. For example, the BER may be measured at the network access unit 202, or at the modem 204, etc. It will be appreciated, that in other embodiments, validation testing may be based on other signal quality metrics; e.g., Eb/NO, signal to noise ratio (SNR), etc. More generally, any metric that can be used to validate proper operation of the two-way satellite communications system 150 may be used. In some embodiments, validation testing may use one metric or multiple metrics in combination.

Figure 3B:
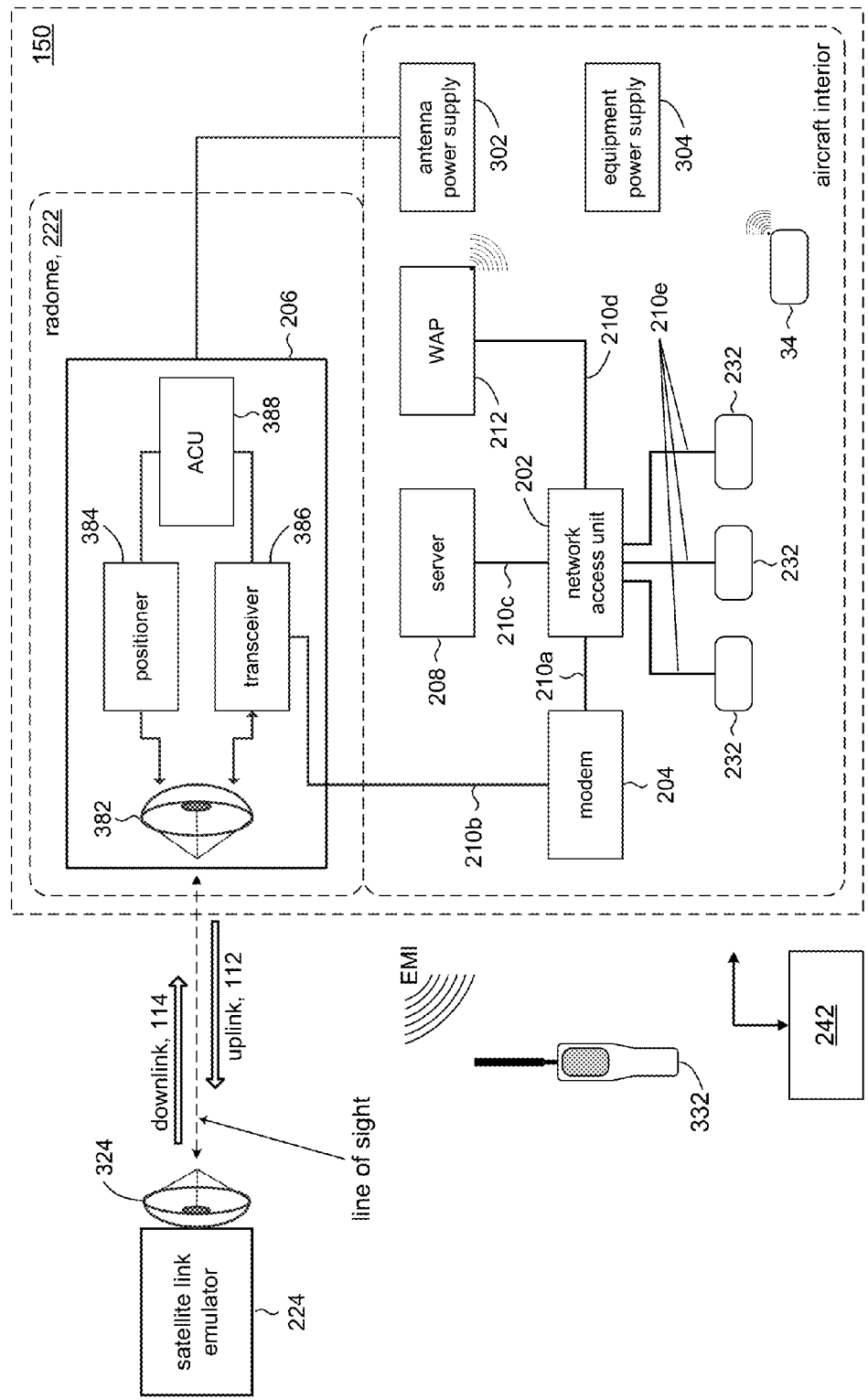

In some embodiments, a validation test may include a test for electromagnetic interference (EMI), in addition to or alternatively to assessing QOI. Referring to FIG. 3B, for example, an EMI test receiver 332 may be used to measure EMI levels within the aircraft 102. EMI levels of individual pieces of equipment may be determined. Ambient EMI levels in different locations within the aircraft 102 may be measured, and so on.

Figure 4:
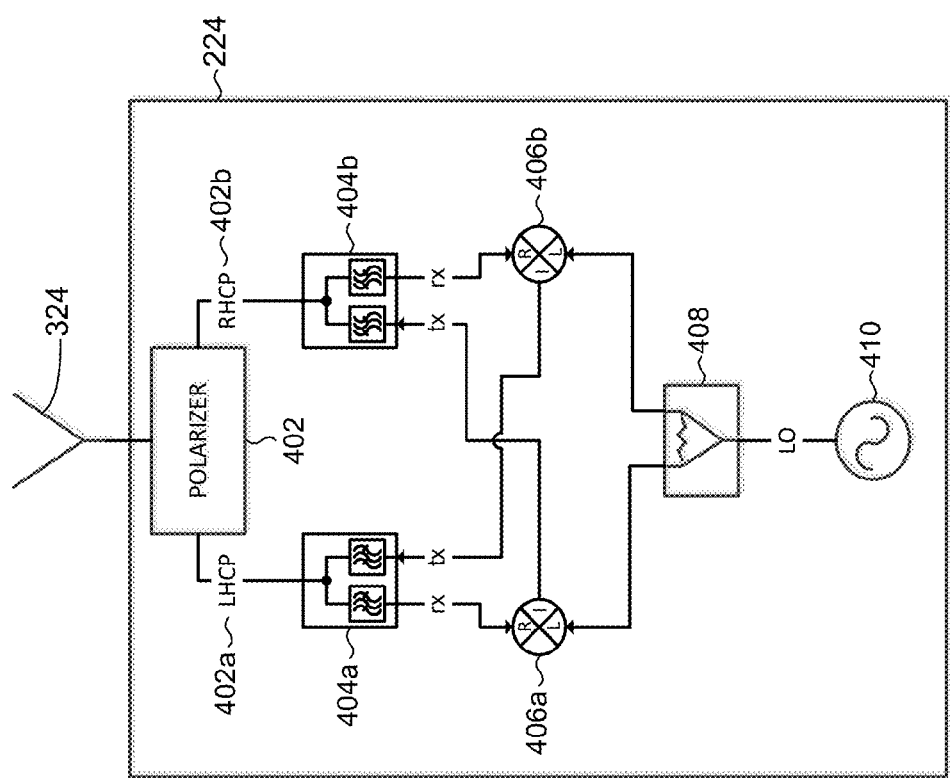
FIG. 4 shows details of an illustrative satellite link emulator.

FIG. 4 is a diagrammatic illustration showing additional details of an illustrative example of the satellite link emulator 224 in accordance with some embodiments of the present disclosure. The satellite link emulator 224 may comprise an antenna 324, and in some embodiments additional antennas may be provided. The satellite link emulator 224 may include a polarizer 402 (e.g., a septum polarizer, or any other suitable polarizer), a left diplexer 404a and a right diplexer 404b, a left mixer 406a and a right mixer 406b, and a local oscillator 410. A splitter 408 can provide the output LO of the local oscillator 410 to the left mixer 406a and the right mixer 406b. In some embodiments, the polarizer 402 may separate right hand circularly polarized (RHCP) signals from left hand circularly polarized (LHCP) signals going into and out of the antenna 324. In other embodiments, one or more of the uplink signal and the downlink signal may have a polarization different than circular. For example, the uplink signal and downlink signal may be different linear polarizations.

In operation, the antenna 324 may receive an uplink signal transmitted from a transmitting antenna (e.g., 382, FIG. 3). The received uplink signal enters the polarizer 402 and exits either the LHCP port 402a or the RHCP port 402b depending on the polarization of the received uplink signal. For example, if the received uplink signal is an LHCP signal, it can exit the polarizer 402 on its LHCP port 402a and enter the left diplexer 404a. Filters comprising the left diplexer 404a can separate the received uplink signal from a downlink signal to be transmitted. The received uplink signal then goes onto the RF port R of the left mixer 406a and gets down converted to a downlink frequency band to produce a corresponding downlink signal. The downlink signal then travels to the right diplexer 404b via the IF port I of the left mixer 406a into the polarizer 402 for conversion into a RHCP signal and subsequently transmitted by the antenna 324.

Thus, a received LHCP uplink signal can flow through the polarization path described to produce the corresponding RHCP downlink signal that is transmitted from the right diplexer 404b. If the antenna 324 receives an RHCP uplink signal, then the received RHCP uplink signal can flow through the other polarization path involving the right diplexer 404b and the right mixer 406b to generate a corresponding LHCP downlink signal for transmission by the antenna 324 via the left diplexer 404a.

The satellite link emulator 224 described herein can emulate a communication link between an antenna (e.g., satellite antenna 382, FIG. 3) and a satellite, for example, by receiving an uplink signal and generating a corresponding downlink signal. In the particular embodiment disclosed, the uplink signal is used to generate the downlink signal. In other embodiments, the satellite link emulator 224 may simulate other aspects of the channel, for example, modeling the free space propagation characteristics of the space between the antenna and an actual satellite, simulate characteristics of an actual satellite, and so on.

In the illustrated embodiment, the uplink signal and the downlink signal have different polarizations and frequencies. As a result, the components of the satellite link emulator 224 are operable to receive the uplink signal and transmit a corresponding downlink signal in response. More generally, the components of the satellite link emulator 224 may be different, depending on the characteristics of the uplink signal and the downlink signal.

FIGS. 5A-5E show various views of an illustrative example of a housing 500 to house the satellite link emulator 224. The housing 500 may include a case 502 to house components comprising the satellite link emulator 224. The housing 500 may include feet 504 to rest the satellite link emulator 224 on a suitable surface. For example, the bottom view of FIG. 5D shows the placement of four feet 504. Handles 506 may be included to facilitate transporting the satellite link emulator 224.

FIGS. 5A (front view) and 5B (side view) show that antenna 324 protrudes from the case 502. Horn protection standoffs 524 may be disposed on the case 502 about the antenna 324 to protect bumping against the antenna 324. In other embodiments, the antenna 324 may be contained mostly within the case 502 and exposed through an opening in the case 502. In yet other embodiments, the antenna 324 may be fully contained in the case 502 and mounted flush with the case 502.

The top view of FIG. 5C shows cable tie mounts 512. The cable tie mounts 512 can be used to secure a power supply for the satellite like emulator 224 to keep it off the aircraft skin.

The back view of FIG. 5E shows a power input 532 for connection to a power source. An ON/OFF switch 534 may be provided to power on and off the satellite link emulator 224. An LED indicator 536 may be provided to indicate the satellite link emulator 224 is powered on. The LED indicator 536 may provide indications of operating conditions (e.g., transmitting, receiving, system error, etc.), for example, by emitting different colors or flashing, and so on. One or more attenuation adjustment knobs 538 may allow a user to adjust the signal strength of a received uplink signal, the downlink signal to be transmitted, etc.

Figure 6:
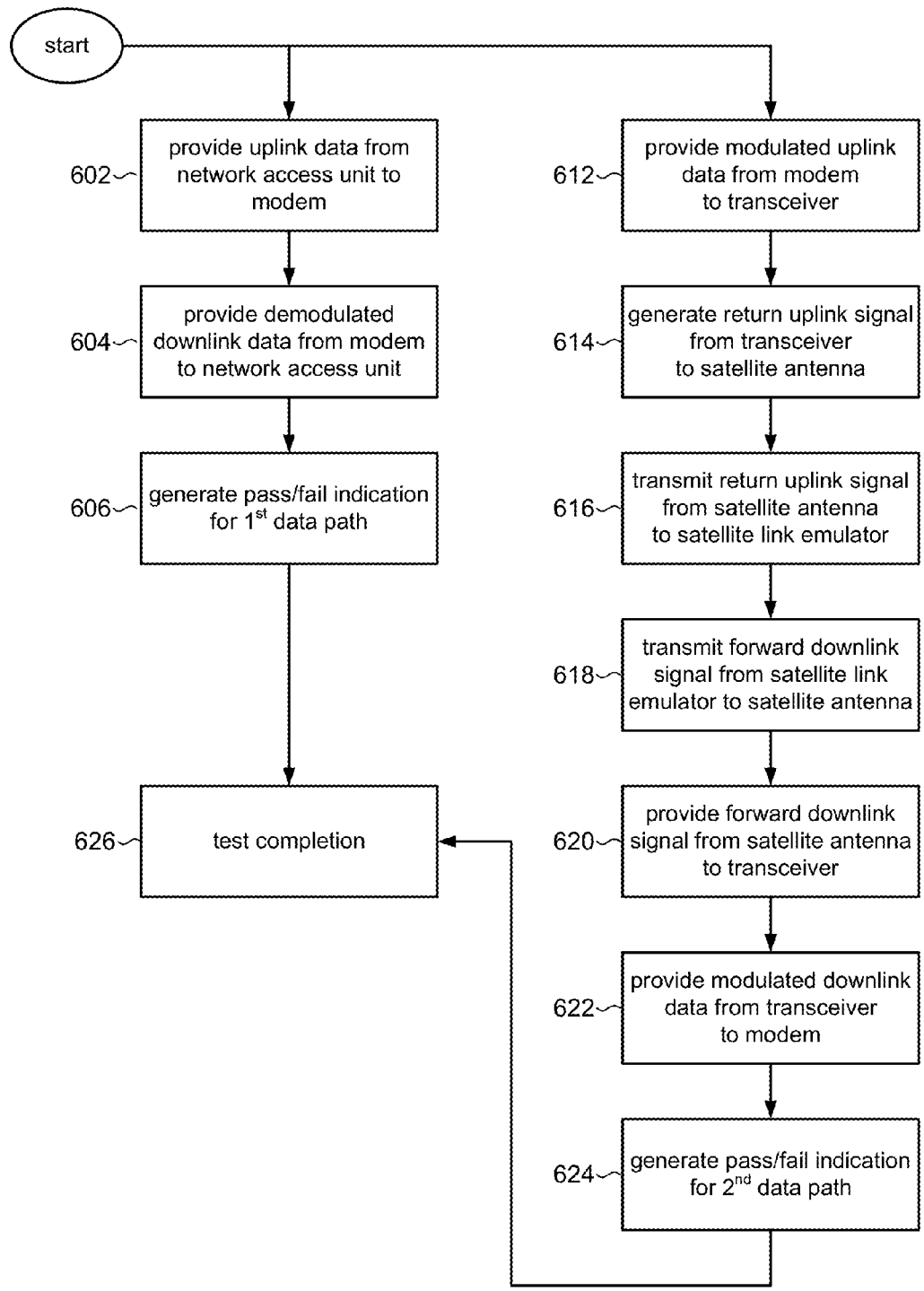
Figures 1, 6A:
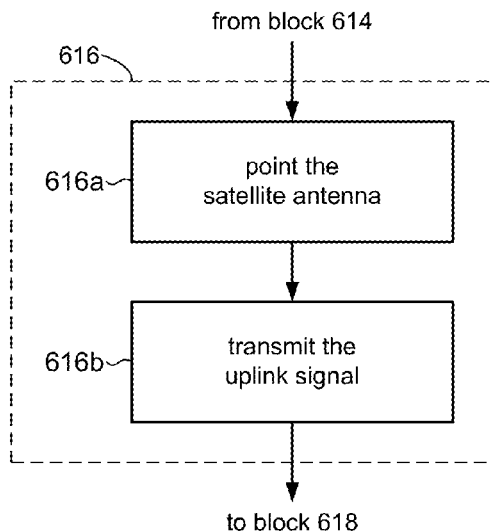
Figures 2, 6A:
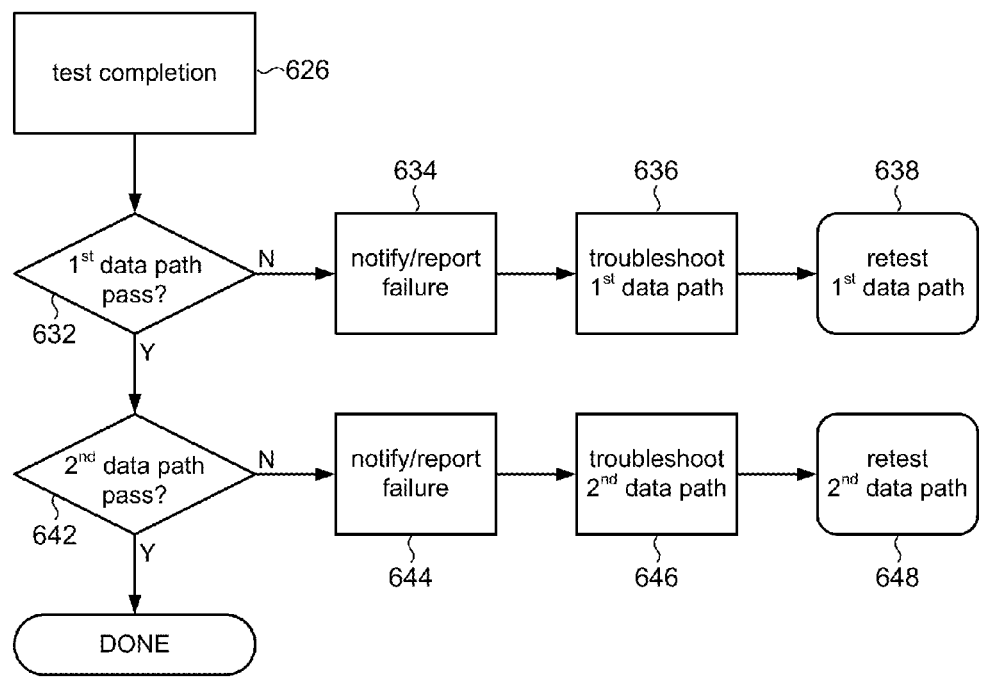

FIG. 6 in conjunction with FIG. 2 shows a process for a validation test in accordance with some embodiments of the present disclosure, to test for proper data communication between the equipment that comprise the two-way satellite communication system 150. Other embodiments may combine some of the steps, may perform the steps in different orders and/or perform different or additional steps to the ones illustrated in FIG. 6. In some embodiments, the validation tests may be performed on separate portions (data paths) of the two-way satellite communication system 150. The validation test may be performed along multiple separate and independent data paths. Testing along separate data paths, for example, allows for incrementally validating the installation of portions of the two-way satellite communication system 150. In addition, by testing multiple data paths which together form the entire data path, the determination of particular equipment and/or connection(s) between equipment that may be faulty can be identified more readily. As such, the validation test may be used in repair depots, such as Maintenance Repair & Overhaul facilities (MROs), as a diagnostics tool to support maintenance and repair procedures, and so on.

Figure 6B:
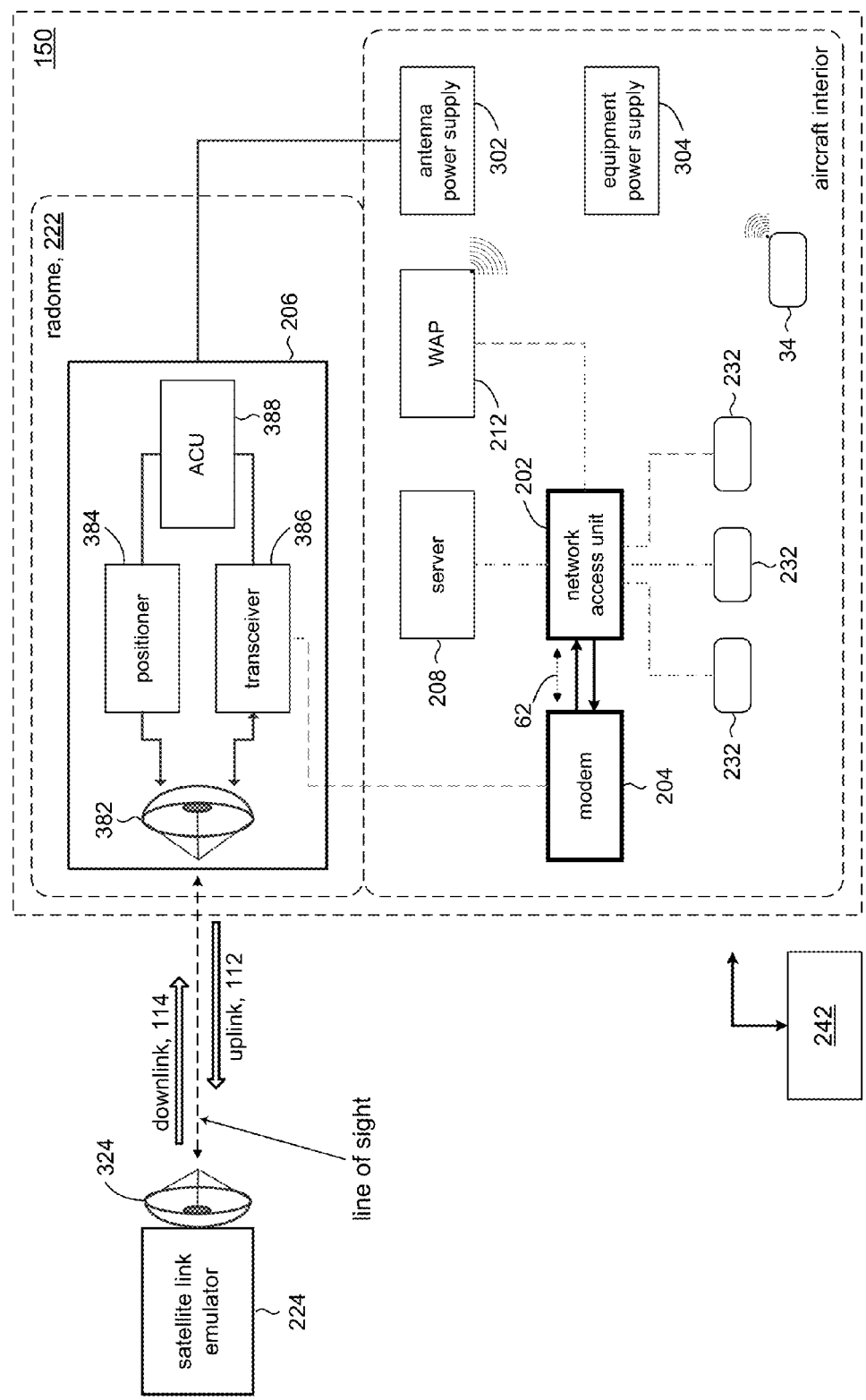
FIGS. 6B and 6C illustrate configurations for validation testing in accordance with an embodiment.
Figure 6C:
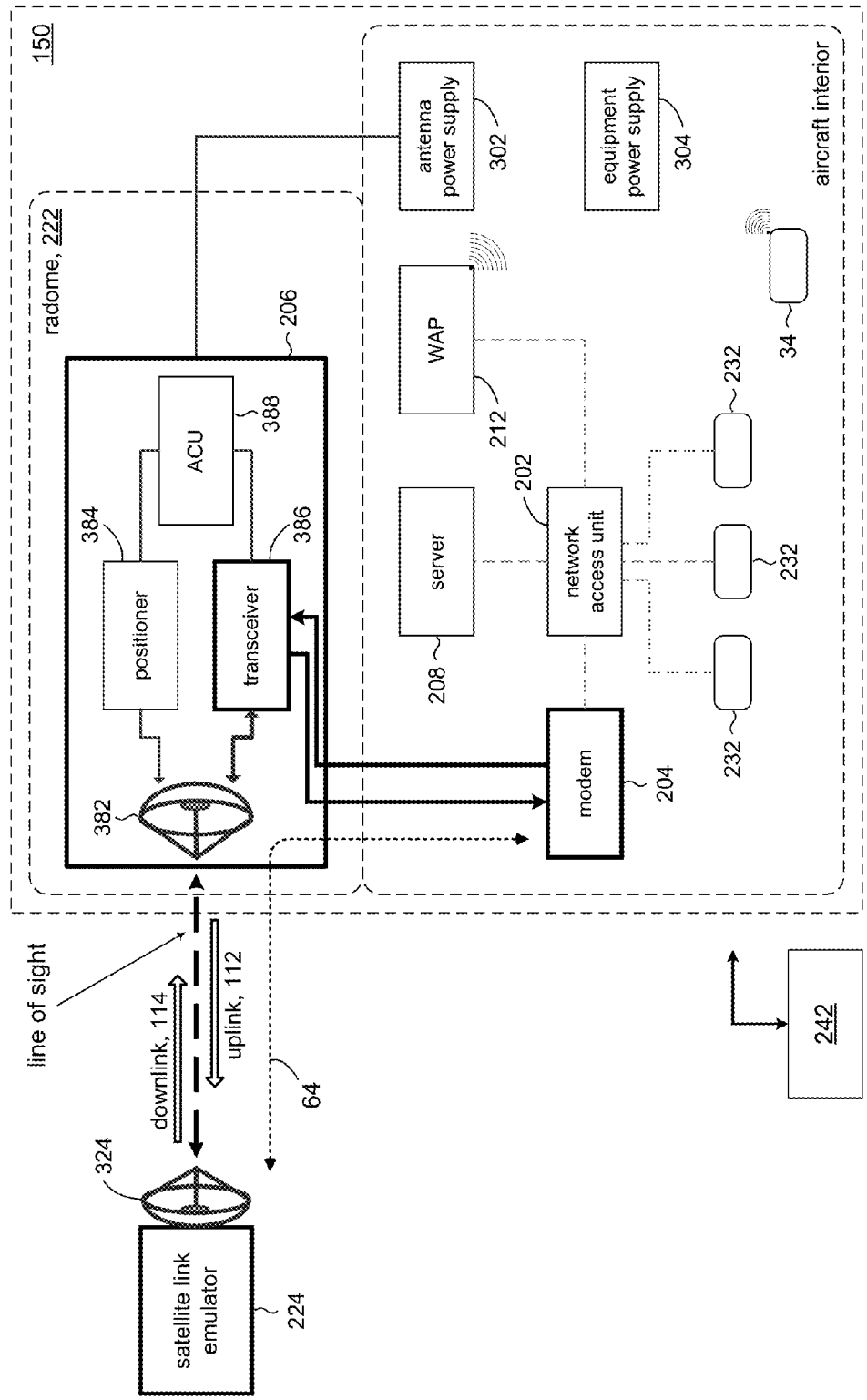

For discussion purposes, the validation test described in FIG. 6 is conducted along two data paths, although it is understood that in other embodiments, the validation test may be performed along more than two data paths. FIG. 6B shows an example of a first data path 62 that can be used to test communication between the network access unit 202 and the modem 204. The equipment under test, namely, network access unit 202 and modem 204, is shown bolded. FIG. 6C, shows an example of a second data path 64 comprising modem 204, transceiver 386, satellite antenna 382, and the satellite link emulator 224, which are shown bolded. The second data path 64 can be used to test communication between the modem 204 and the satellite antenna assembly 206 vis-à-vis the transceiver 386 and the satellite antenna 382. In some embodiments, the data paths 62, 64 may be tested concurrently in parallel. In other embodiments, the data paths 62, 64 may be tested one after the other.

At 602, the validation controller 242 may initiate a validation test in the first data path 62. For example, the validation controller 242 may communicate with the network access unit 202 to initiate the communication of uplink data from the network access unit 202 to the modem 204. In some embodiments, the network access unit 202 may have a test mode in which the uplink data is a "ping" sent from the network access unit 202. In other embodiments, the uplink data may be generated by the validation controller 242 and provided to the network access unit 202; e.g., the validation controller 242 may serve as a source of the uplink data to simulate data traffic in the two-way satellite communication system 150. In still other embodiments, the uplink data be provided to the network access unit 202 wirelessly via the WAP 212, etc.

At 604, the modem 204 may receive the uplink data from the network access unit 202, and in response may provide demodulated downlink data to the network access unit 202. In some embodiments, for example, the modem 204 may have a test mode during which time it can loop the uplink data it receives from the network access unit 202 back to the network access unit 202 as demodulated downlink data.

At 606, a pass/fail indication may be generated that represents a pass/fail indication for validation testing on the first data path 62. In some embodiments, the validation controller 242 may determine the pass/fail indication. In other embodiments, the pass/fail indication may be determined in the network access unit 202. In some embodiments, the BER may be used as a pass/fail indication. For example, the network access unit 202 may compare the uplink data that it sent to the modem 204 (at 602) with the demodulated downlink data that it received from the modem 204 (at 604) to compute or otherwise generate a BER metric. In general, any metric that can be used to validate proper operation of the two-way satellite communications system 150 may be used to generate a pass/fail indication. In some embodiments, the pass/fail indication may use one metric. In other embodiments, the pass/fail indication may use multiple metrics in combination.

Processing may then proceed from 606 to 626 for test completion processing.

The data flow in the first data path 62 is illustrated in FIG. 6B. The first data path 62 comprises an exchange of data only between the network access unit 202 and the modem 204, which are shown highlighted. In some embodiments, the return data from the modem 204 may be generated only from data received from the network access unit 202.

Returning to FIG. 6, the validation controller 242 may initiate a validation test in the second data path 64, at 612. For example, the validation controller 242 may initiate a test mode in the modem 204 to generate modulated uplink data. The modem 204 may provide the modulated uplink data to the transceiver 386. In some embodiments, for example, the modem 204 may internally generate test data that it then modulates (e.g., with an R/F carrier) to produce the modulated uplink data. In other embodiments, the validation controller 242 may generate the test data and provide the generated test data to the modem 204.

At 614, the transceiver 386 may provide the modulated uplink data as a return uplink signal to the satellite antenna 382. For example, the transceiver 386 may upconvert the modulated uplink data to a suitable frequency range for satellite communication to produce the return uplink signal.

At 616, the transceiver 386 may include power amplification circuits to amplify the return uplink signal in order to drive the satellite antenna 382 to transmit the return uplink signal to the satellite link emulator 224. Referring for a moment to FIG. 6A-1, in some embodiments, block 616 may comprise a step 616a of pointing the satellite antenna 382 to point to the satellite link emulator 224. For example, when the satellite link emulator 224 is positioned near the satellite antenna assembly 206 for testing, its antenna 324 component may not be adequately aligned with the satellite antenna 382. Accordingly, the positioner 384 may need to point the satellite antenna 382 toward the antenna 324. At 616b, the return uplink signal may be transmitted to the satellite link emulator 224. It will be appreciated that in other embodiments, the satellite antenna 382 to antenna 324 alignment may be made prior to running the test, for example, as part of an installation step when the satellite link emulator 224 is installed.

Continuing with FIG. 6, at 618, the satellite link emulator 224 may transmit a forward downlink signal to the satellite antenna 382, in response to receiving the return uplink signal from the satellite antenna 382. A process for generating the forward downlink signal was described in connection with FIG. 4. For example, the satellite link emulator 224 may transmit the return uplink signal received at its antenna 324 as the forward downlink signal.

At 620, the satellite antenna 382 may receive the forward downlink signal transmitted by the satellite link emulator 224 and provide the forward downlink signal to the transceiver 386. The transceiver 386 may condition the forward downlink signal; e.g., filter out noise in the forward downlink signal, amplify the forward downlink signal, etc.

At 622, the transceiver 386 may provide the forward downlink signal to the modem 204 as modulated downlink data. For example, the transceiver 386 may down convert the forward downlink signal to a frequency range suitable for the modem 204 (e.g., the frequency range of the modulation used by the modem 204) to produce the modulated downlink data.

At 624, the modem 204 may generate a pass/fail indication for the second data path 64 from the modulated downlink data. Since in the illustrated embodiment at 618, the satellite link emulator 224 transmits the received return uplink signal as the forward downlink signal, the modulated uplink data generated at 612 should contain the same data as in the modulated downlink data received at 622. Accordingly, at 624, the modem 204 may compare the test data generated at 612 with data recovered from demodulating the modulated downlink signal. In some embodiments, the comparison may be used to generate a BER metric. In general, any metric that can be used to validate proper operation of the two-way satellite communications system 150 may be used to generate a pass/fail indication. In some embodiments, the pass/fail indication may use one metric. In other embodiments, the pass/fail indication may use multiple metrics in combination.

Processing may then proceed to 626 for test completion processing.

When testing completes at 606 in the first data path 62 and testing completes at 624 in the second data path 64, processing may continue to test completion at 626. Referring to FIG. 6A-2, if at 632, the pass/fail indication for the first data path 62 indicates FAIL, then at 634, a notification or other reporting may be made to report the test failure on the first data path 62. At 636, a troubleshooting procedure may be initiated on equipment and connections that comprise the two-way satellite communication system 150 to identify and correct the cause of the test failure on the first data path 62. At 638, a retest of the first data path 62 may be initiated and performed as described above with respect to 602, 604, 606 of FIG. 6.

Similarly, if at 642, the pass/fail indication for the second data path 64 indicates FAIL, then at 644, a notification or other reporting may be made to report the test failure on the second data path 64. At 646, a troubleshooting procedure may be initiated on equipment and connections that comprise the two-way satellite communication system 150 to identify and correct the cause of the test failure on the second data path 64. At 648, a retest of the second data path 64 may be initiated and performed as described above with respect to 612, 614, 616, 618, 620, 622, 624 of FIG. 6.

As noted above, the process illustrated in FIG. 6 provides validation testing on separate data paths 62, 64 of the two-way satellite communication system 150. In other embodiments, the validation testing may be performed on the two-way satellite communication system 150 as a single data path. This aspect of the present disclosure will now be described.

Figure 7:
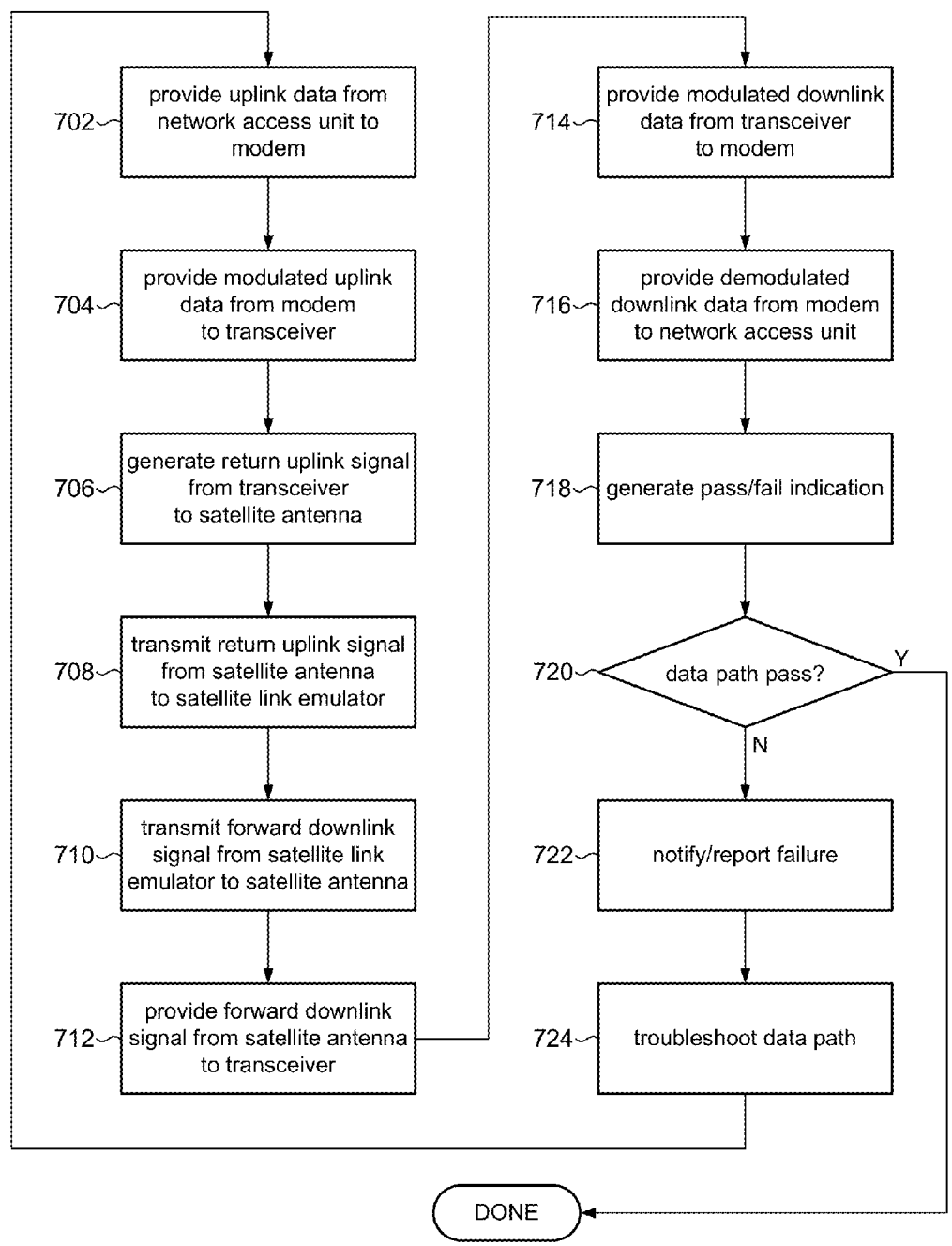
FIG. 7 shows a process for a validation test in accordance with an embodiment.
Figure 7A:
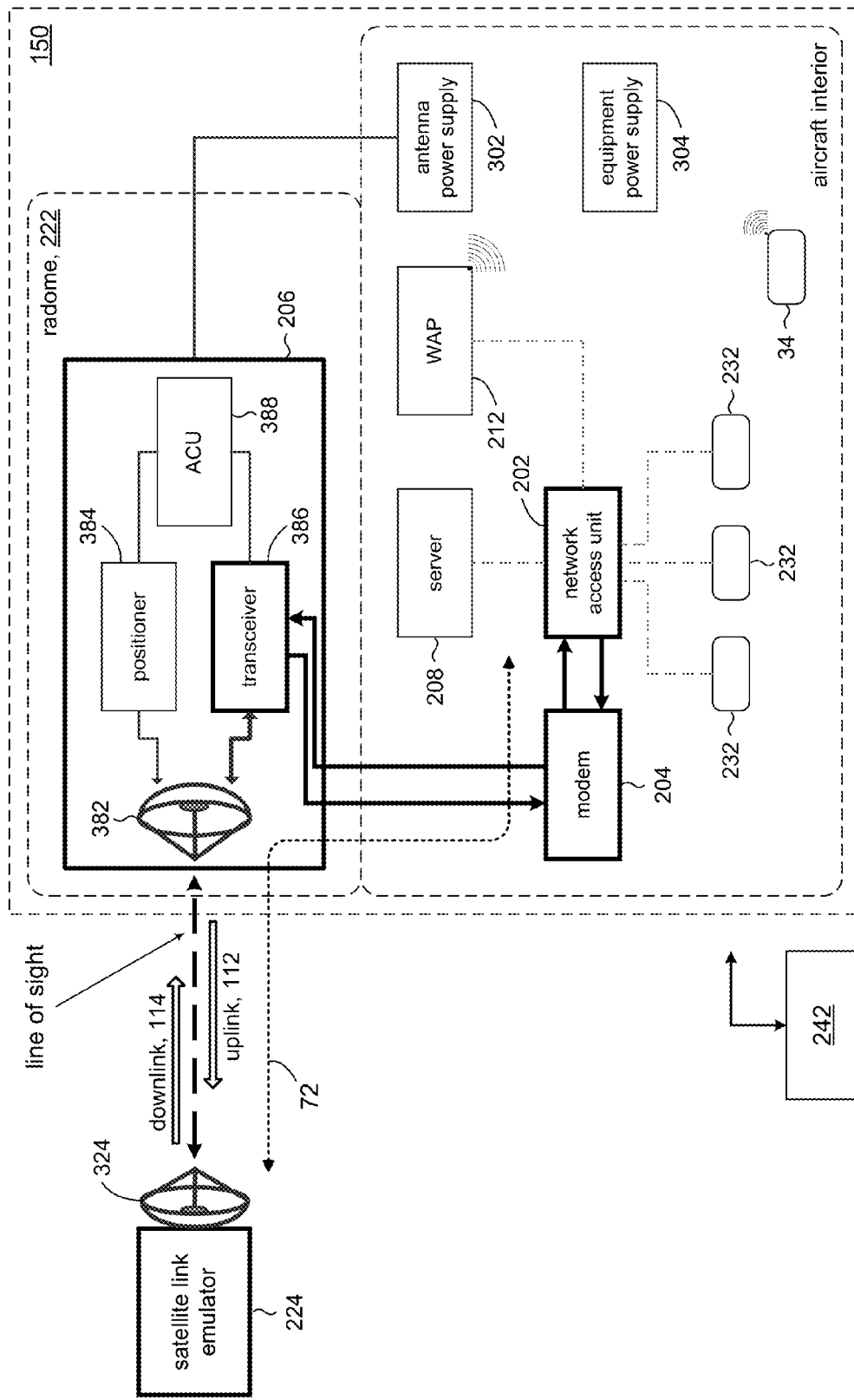
FIG. 7A illustrates a configuration for validation testing in accordance with an embodiment.

FIG. 7 in conjunction with FIG. 2 shows a process for a validation test in accordance with some embodiments of the present disclosure, to test for proper data communication between the equipment that comprise the two-way satellite communication system 15. Other embodiments may combine some of the steps, may perform the steps in different orders and/or perform different or additional steps to the ones illustrated in FIG. 7. In this particular embodiment, the validation test may be performed on a single data path 72 (FIG. 7A) in the two-way satellite communication system 150.

At 702, the validation controller 242 may initiate a validation test in the data path 72. For example, the validation controller 242 may communicate with the network access unit 202 to provide uplink data from the network access unit 202 to the modem 204. As explained above, the network access unit 202 may ping the modem 204, or the validation controller 242 may generate simulated data traffic that it can provide to the network access unit 202.

At 704, the modem 204 can modulate the received uplink data and provide the modulated uplink data to the transceiver 386.

At 706, the transceiver 386 may provide the modulated uplink data as a return uplink signal to the satellite antenna 382. For example, the transceiver 386 may up convert the modulated uplink data to a suitable frequency range for satellite communication to produce the return uplink signal.

At 708, the transceiver 386 may include power amplification circuits to amplify the return uplink signal in order to drive the satellite antenna 382 to transmit the return uplink signal to the satellite link emulator 224. As explained above, the satellite antenna 382 may need to be aligned with the antenna in the satellite link emulator 224. This alignment can occur prior to the test sequence, or during the test sequence prior to transmitting the uplink signal.

At 710, the satellite link emulator 224 may transmit a forward downlink signal to the satellite antenna 382, in response to receiving the return uplink signal from the satellite antenna 382. As explained above, the satellite link emulator 224 may transmit the return uplink signal received at its antenna 324 as the forward downlink signal. In other words, the satellite link emulator 224 in effect may reflect back the return uplink signal.

At 712, the satellite antenna 382 may receive the forward downlink signal transmitted by the satellite link emulator 224 and provide the forward downlink signal to the transceiver 386. The transceiver 386 may condition the forward downlink signal; e.g., filter out noise in the forward downlink signal, amplify the forward downlink signal, etc.

At 714, the transceiver 386 may provide the forward downlink signal to the modem 204 as modulated downlink data. For example, the transceiver 386 may down convert the forward downlink signal to a frequency range suitable for the modem 204 (e.g., the frequency range of the modulation used by the modem 204) to produce the modulated downlink data.

At 716, the modem 204 may demodulate the modulated downlink data to generate demodulated downlink data. The modem 204 may provide the demodulated downlink data to the network access unit 202 as downlink data. Since at 710, the satellite link emulator 224 can transmit the received return uplink signal as the forward downlink signal, the downlink data received from the modem 204 should be the same data as the uplink data provided to the modem 204 at 702.

At 718, a pass/fail indicator may be generated. In some embodiments, for example, the BER may be used as the pass/fail indicator. For example, the network access unit 202 may compare the uplink data that it sent to the modem 204 (at 702) with the downlink data that it received from the modem 204 (at 716) to compute or otherwise generate a BER metric. In general, any metric that can be used to validate proper operation of the two-way satellite communications system 150 may be used to generate a pass/fail indication. In some embodiments, the pass/fail indication may use one metric. In other embodiments, the pass/fail indication may use multiple metrics in combination.

If at 720, the pass/fail indication indicates FAIL, then at 722, a notification or other reporting may be made to report the test failure on the data path 72. At 724, a troubleshooting procedure may be initiated on equipment and connections to identify and correct the cause of the test failure on the data path 72. Another validation test may be conducted to confirm the troubleshooting effort.

In some embodiments in accordance with the present disclosure, a process for a validation test may assess whether operation of two-way satellite communications system 150 is in compliance with applicable regulations. For example, regulations may impose restrictions on allowable levels of EM emissions. Accordingly, a validation test in accordance with some embodiments may include conducting avionics electromagnetic interference (EMI) tests using simulated traffic data in the two-way satellite communication system 150:

Traffic data may be simulated by creating traffic in the two-way satellite communication system 150 as explained above, including sending forward downlink signals to the satellite link emulator 224 and receiving return uplink signals from the satellite link emulator 224.

Measurements of EM emission levels may be taken at various locations in the aircraft. The kinds of measurements taken and locations of the measurements may vary depending on the applicable regulations.

Measurement results may then be assessed against the applicable regulations.

Non-compliant results may trigger a round of troubleshooting activity to identify and correct the non-compliance.

Retesting may be performed to assess compliance with the applicable regulations.

In some embodiments according to the present disclosure, validation tests may include other kinds of tests to assess proper operation of the two-way satellite communication system 150. Validation tests may include any one test (e.g., QOI assessment or EMI testing) or a combination of several tests (e.g., QOI assessment and EMI testing).

In embodiments described above, the satellite link emulator can be used to validate a two-way satellite communication system. Alternatively, the techniques described herein may be used to validate a one-way satellite communication system, such as a receive-only satellite TV system. For example, during a validation test the satellite link emulator may generate data, or be provided data from the validation controller (or some other source), and transmit the downlink signal to the one-way satellite communication system. Similar techniques to those described above can then be used to determine a pass/fail indication of the one-way satellite communication system, such as using one or more measured signal quality metrics of the downlink signal received by the one-way satellite communication system.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method of validating a two-way satellite communication system in an aircraft, the method comprising:
    providing the two-way satellite communication system in the aircraft, the two-way satellite communication system comprising:
        a network access unit to provide network access for a plurality of data devices;
        a modem to modulate uplink data received from the network access unit to obtain an uplink signal, and demodulate a downlink signal to obtain demodulated downlink data provided to the network access unit; and
        a satellite antenna assembly to transmit the uplink signal, and to receive the downlink signal;
    arranging a satellite link emulator proximate the aircraft;
    performing a validation test of the two-way satellite communication system using the satellite link emulator, including receiving, at the satellite link emulator, the transmitted uplink signal from the satellite antenna assembly, and transmitting, using the satellite link emulator, the downlink signal to the satellite antenna assembly in response to the received uplink signal; and
    determining a pass/fail indication based on operation of the network access unit, the modem, and the satellite antenna assembly during the validation test.

2. The method of claim 1, wherein determining the pass/fail indication is based on one or more measured signal quality metrics of data traffic communicated in the two-way satellite communication system during the validation test.

3. The method of claim 1, wherein arranging the satellite link emulator comprises arranging the satellite link emulator on an exterior of the aircraft.

4. The method of claim 1, wherein performing the validation test of the two-way satellite communication system further includes generating data in the network access unit to simulate data traffic in the two-way satellite communication system.

5. The method of claim 1, wherein performing the validation test of the two-way satellite communication system further includes receiving data in the network access unit to simulate data traffic in the two-way satellite communication system.

6. The method of claim 5, wherein performing the validation test of the two-way satellite communication system further includes initiating the validation test using a validation controller, and the received data in the network access unit is from the validation controller.

7. The method of claim 5, wherein the received data is wirelessly received data in the network access unit.

8. The method of claim 1, wherein performing the validation test of the two-way satellite communication system further includes performing first communications between the network access unit and the modem and performing second communications between the modem, the satellite antenna, and the satellite link emulator, separate from and independent of the first communications.

9. The method of claim 8, wherein the pass/fail indication is based on results of each of the first communications and the second communications.

10. The method of claim 1, wherein performing the validation test of the two-way satellite communication system comprises conducting an electromagnetic interference (EMI) test.

11. An apparatus comprising:
a two-way satellite communication system in an aircraft, the two-way satellite communication system comprising:
   a network access unit to provide network access for a plurality of data devices;
   a modem to modulate uplink data received from the network access unit to obtain an uplink signal, and demodulate a downlink signal to obtain demodulated downlink data provided to the network access unit;
   a satellite antenna assembly to transmit the uplink signal, and to receive the downlink signal; and
a validation system to validate the two-way satellite communication system, the validation system comprising:
   a satellite link emulator; and
   a validation controller to initiate a validation test of the two-way satellite communication system using the satellite link emulator, the validation test including communicating data traffic in the two-way satellite communication system to cause the satellite antenna assembly to transmit the uplink signal to the satellite link emulator and in response cause the satellite link emulator to transmit the downlink signal to the satellite antenna assembly,
   the validation controller further to determine a pass/fail indication based on operation of the network access unit, the modem, and the satellite antenna assembly during the validation test.

12. The apparatus of claim 11, wherein the pass/fail indication is based on one or more measured signal quality metrics of data traffic communicated in the two-way satellite communication system during the validation test.

13. The apparatus of claim 11, wherein the satellite link emulator is disposed on an exterior of the aircraft.

14. The apparatus of claim 11, wherein the validation test further includes the reception of data in the network access unit to simulate the data traffic in the two-way satellite communication system.

15. The apparatus of claim 14, wherein the received data in the network access unit is from the validation controller.

16. The apparatus of claim 14, wherein the received data is wirelessly received in the network access unit.

17. The apparatus of claim 11, wherein the validation test further includes first communications between the network access unit and the modem and second communications between the modem, the satellite antenna, and the satellite link emulator, independent of and separate from the first communications.

18. The apparatus of claim 17, wherein the pass/fail indication is based on results of each of the first communications and the second communications.

19. The apparatus of claim 11, wherein the validation system further comprising an electromagnetic interference (EMI) test receiver, and the validation test includes an EMI test.

* * * * *